US008480056B2

United States Patent
Ishikawa et al.

(10) Patent No.: US 8,480,056 B2
(45) Date of Patent: Jul. 9, 2013

(54) ELECTROMAGNETIC VALVE HAVING VALVE BODY WITH CONICAL PORTION

(75) Inventors: Motokazu Ishikawa, Kariya (JP); Yuuji Yabuki, Anjo (JP)

(73) Assignees: Advics Co., Ltd., Kariya, Aichi (JP); Denso Corporation, Kariya, Aichi (JP)

( * ) Notice: Subject to any disclaimer, the term of this patent is extended or adjusted under 35 U.S.C. 154(b) by 71 days.

(21) Appl. No.: 13/186,883

(22) Filed: Jul. 20, 2011

(65) Prior Publication Data

US 2012/0018655 A1 Jan. 26, 2012

(30) Foreign Application Priority Data

Jul. 20, 2010 (JP) ................................. 2010-162786

(51) Int. Cl.
*F16K 31/06* (2006.01)
(52) U.S. Cl.
USPC ..................... 251/129.15; 251/333; 303/119.2
(58) Field of Classification Search
USPC .................. 239/533.1–533.12, 585.1, 585.5; 251/129.01, 129.02, 129.15, 333; 303/119.2
See application file for complete search history.

(56) References Cited

U.S. PATENT DOCUMENTS

| | | | | |
|---|---|---|---|---|
| 4,786,030 A | * | 11/1988 | Greiner et al. | ............ 251/129.15 |
| 4,934,605 A | * | 6/1990 | Hans et al. | ................. 239/585.4 |
| 5,673,980 A | * | 10/1997 | Schwarz et al. | ............ 303/119.2 |
| 5,772,124 A | * | 6/1998 | Tamaki et al. | ............ 239/533.12 |
| 6,182,912 B1 | * | 2/2001 | Muller et al. | ............... 239/585.1 |
| 6,296,199 B1 | * | 10/2001 | Noller et al. | ............. 239/533.12 |
| 6,705,589 B2 | * | 3/2004 | Hofmann et al. | ............. 251/333 |
| 6,715,700 B2 | * | 4/2004 | Nakano et al. | ................. 251/333 |
| 6,817,546 B2 | * | 11/2004 | Battistini et al. | ......... 239/533.12 |
| 6,976,665 B2 | * | 12/2005 | Seitz et al. | .................. 303/119.2 |
| 7,168,679 B2 | * | 1/2007 | Shirase et al. | ............ 251/129.02 |
| 7,404,526 B2 | * | 7/2008 | Cooke et al. | ............. 239/533.11 |
| 2009/0145401 A1 | * | 6/2009 | Cooke | ........................... 123/446 |

FOREIGN PATENT DOCUMENTS

JP 2002-347597 A 12/2002

* cited by examiner

*Primary Examiner* — John Bastianelli
(74) *Attorney, Agent, or Firm* — Buchanan Ingersoll & Rooney PC

(57) ABSTRACT

A conical portion is provided at the tip of a main valve body. When brake fluid hits the conical portion of the main valve body, the brake fluid is bounced back at substantially the same angle at which it hits the conical surface of the conical portion. However, the movement direction of the bounced brake fluid is not largely inclined from the direction that the brake fluid is to be caused to flow. Therefore, the flow resistance is reduced. Further, generatrices of the conical portion agree with tangent lines to the spherical surface and the boundary area between the spherical surface and the conical surface is continuous without a step. Therefore, the brake fluid is rectified by these surfaces when it flows. It is possible to reduce the amount of fluctuation in pressure differential relative to fluctuation in the flow rate of brake fluid.

4 Claims, 5 Drawing Sheets

ELECTROMAGNETIC VALVE HAVING VALVE BODY WITH CONICAL PORTION

CROSS REFERENCE TO RELATED APPLICATION

This application is based upon and claims the benefit of Japanese Patent Application No. 2010-162786 filed on Jul. 20, 2010, the content of which are incorporated herein by reference.

FIELD OF THE INVENTION

The present invention relates to an electromagnetic valve in which a different pressure state can be established by shifting the position of a valve body by energization and which is favorably applicable to, for example, an actuator of ABS (Antilock Brake System) for avoiding the lock tendency of wheels.

DESCRIPTION OF RELATED ART

An electromagnetic valve applied to an actuator of ABS has been conventionally proposed in Patent Document 1 (JP-A-2002-347597). The electromagnetic valve described in Patent Document 1 is a normally open on-off controlled electromagnetic valve that operates as described below. A plunger sucked when a coil is energized is slidably housed in a closed-end cylindrical sleeve. A valve member that is actuated following the plunger and opens or closes a flow path is slidably held in a guide hole provided in a guide. The valve member is abutted against the plunger and the plunger and the valve member are biased in the valve opening direction by a spring. The electromagnetic valve is fully opened when the coil is not energized and fully closed when the coil is energized.

A normally open differential pressure controlled electromagnetic valve having the same configuration is also known. In this electromagnetic valve, the pressure differential between the upstream and the downstream of the electromagnetic valve is linearly adjusted by controlling the amount of energization of a coil.

In these conventional electromagnetic valves, the tip of the valve body is spherical and the valve closing and opening operations are carried out by bringing the spherical surface into or out of contact with a valve seat formed in a seat. When the electromagnetic valve is used as a differential pressure control valve, a desired pressure differential can be produced between the upstream and the downstream of the electromagnetic valve by controlling the amount of energization of a coil to adjust the gap between the valve body and the valve seat.

However, these conventional electromagnetic valves involve a problem. When fluid flows in the gap between the valve seat and the valve body through a flow path connecting to the valve seat provided in a seat, the fluid that hit the tip of the valve body configured as a spherical surface cannot smoothly flow. This increases differential pressure fluctuation due to fluctuation in flow rate.

More specific description will be given. The pressure differential produced by an electromagnetic valve has dependence on flow rate and there is the following relation between them: the pressure differential is increased with increase in flow rate. When the tip of a valve body is spherical, the amount of fluctuation in pressure differential corresponding to fluctuation in flow rate is large. For this reason, even when the amount of energization of a coil is made equal, the pressure differential is also varied according to variation in flow rate and this increases deviation from a desired pressure differential. With the amounts of energization of coils made equal, the flow rate may vary because of variation from product to product. Also in this case, when the amount of fluctuation in pressure differential according to flow rate is large, with the amounts of energization of coils made equal, the flow rate greatly varies from product to product and consequently, variation is also produced in the produced pressure differential. Especially, at low temperatures, the viscosity of fluid is increased and the flow rate largely changes from those at high temperatures or on other like occasions. This increases fluctuation in pressure differential.

A normally open electromagnetic valve is taken here as an example of the differential pressure control valve. Instead, the differential pressure control valve may be a normally closed electromagnetic valve. Also in normally closed electromagnetic valves, the tip of their valve body is spherical and the same problem as above arises.

SUMMARY OF THE INVENTION

In consideration of the foregoing, it is an object of the invention to provide an electromagnetic valve in which it is possible to reduce the amount of fluctuation in pressure differential relative to fluctuation in flow rate.

According to a first aspect of the invention, an electromagnetic valve is provided to achieve the above object. In this electromagnetic valve, the distance between a valve body and a valve seat is controlled by adjusting the amount of energization of a coil; and the pressure differential between the fluid pressure in a first flow path and the fluid pressure in a second flow path is thereby controlled. Further, the valve body is so configured that a seat portion in contact with the valve seat is spherical and the area between the seat portion and the tip is a conical portion; and the generatrices of the conical portion and the tangent lines to the spherical surface agree with each other.

As mentioned above, the electromagnetic valve is so structured that the conical portion is provided at the tip of the valve body. With this configuration, when fluid hits the conical portion of the valve body, the fluid is bounced back at substantially the same angle at which it hit the conical surface of the conical portion. However, the direction of movement of the bounced fluid is not inclined so much from the direction in which the fluid is to be caused to flow as compared with, for example, the valve bodies that do not have a conical portion and whose tip is all spherical. Therefore, the flow resistance is made lower than spherical surfaces and the fluid can smoothly flow. In addition, the generatrices of the conical surface of the conical portion are matched with the tangent lines to the spherical surface; and the boundary area between the spherical surface and the conical surface is continuous without a step and the fluid is rectified by these surfaces when it flows. For this reason, it is possible to reduce the amount of fluctuation in pressure differential relative to fluctuation in the flow rate of the fluid.

The tip of this conical portion can be formed in a pointed shape. However, the tip of the conical portion may be configured as a spherical surface as according to a second aspect of the invention; or the tip of the conical portion may be configured as a flat surface as according to a third aspect of the invention. In case of these shapes, the flow resistance is slightly increased as compared with cases where the tip of the conical portion is in a pointed shape. However, the same effect as according to the first aspect can be obtained.

DETAILED DESCRIPTION OF THE PREFERRED EMBODIMENTS

Figure 1:
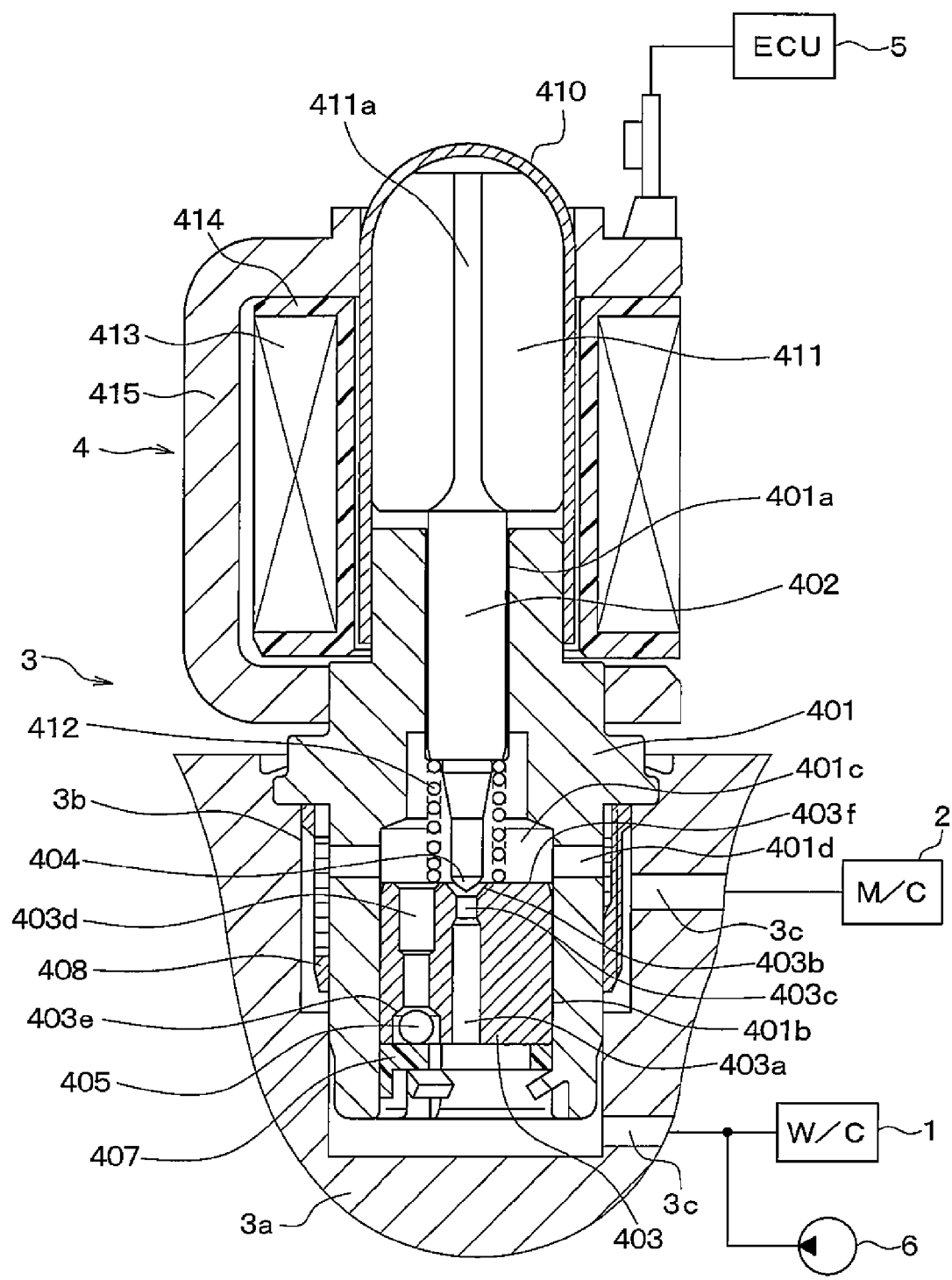
FIG. 1 is a front sectional view illustrating how a normally open electromagnetic valve in a first embodiment of the invention is assembled to the housing of an actuator.

Hereafter, description will be given to embodiments of the invention. In relation to the following description of each embodiment, identical or similar portions will be marked with the same reference numerals in the drawings.

(First Embodiment)

Figure 2:
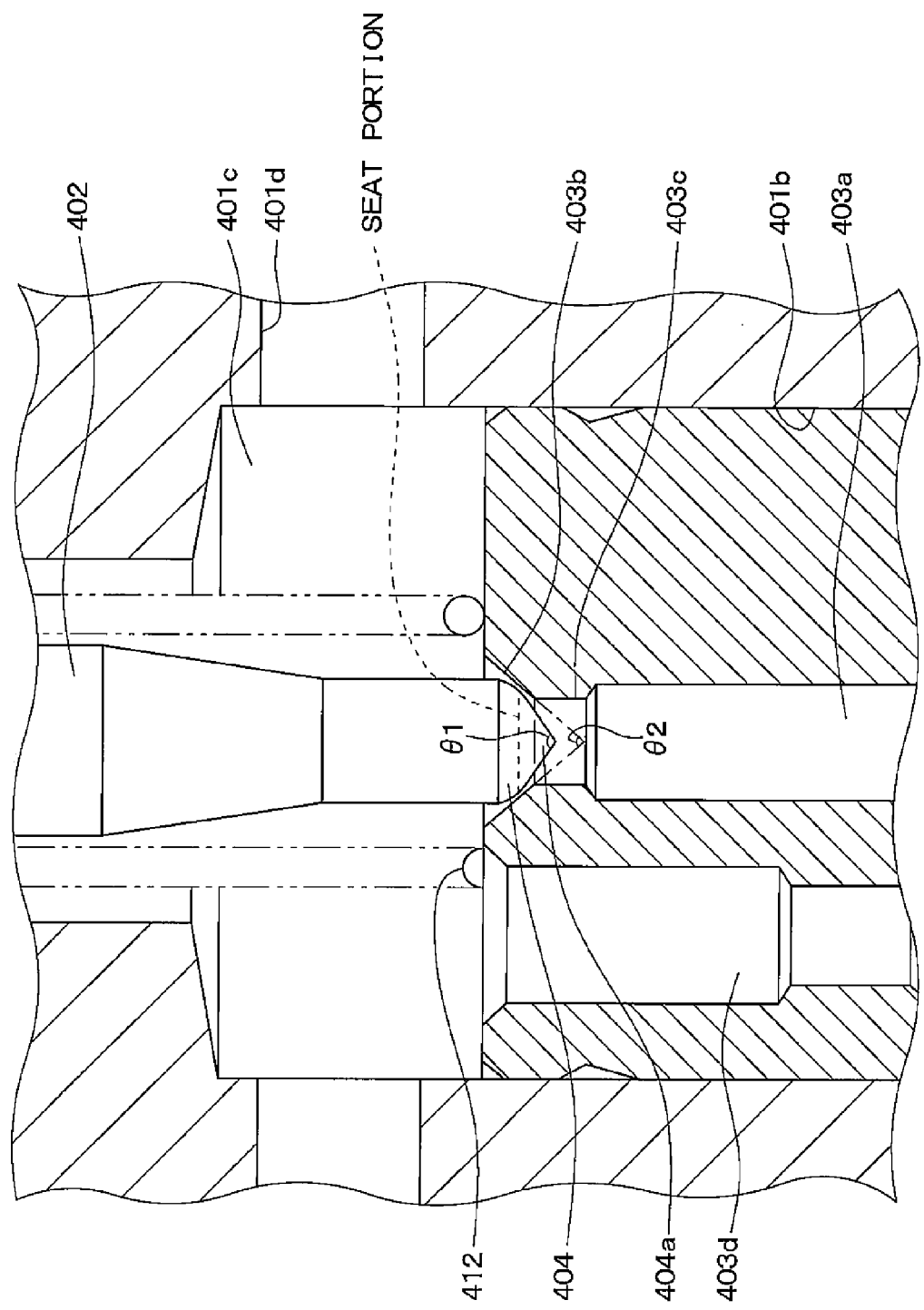
FIG. 2 is a front sectional view of a substantial part of the electromagnetic valve in FIG. 1.

Description will be given to the first embodiment of the invention. FIG. 1 is a front sectional view of a normally open electromagnetic valve in the first embodiment of the invention as is assembled to the housing of an actuator; and FIG. 2 is a front sectional view of a substantial part of the electromagnetic valve in FIG. 1.

As illustrated in FIG. 1, a hydraulic pressure control actuator 3 that controls brake fluid pressure is placed between the master cylinder (hereafter, abbreviated as M/C) 2 and a wheel cylinder (hereafter, abbreviated as W/C) 1 of a vehicle. The hydraulic pressure control actuator 3 includes a housing 3a of aluminum alloy and the following are formed in this housing 3a: a stepped columnar recessed portion 3b into which an electromagnetic valve 4 is inserted; and a flow path 3c for circulating brake fluid between the M/C 2 and the W/C 1.

The electromagnetic valve 4 includes a stepped cylindrical guide 401 formed of magnetic material. One end of this guide 401 is inserted into the recessed portion 3b in the housing 3a and the other end thereof is protruded to outside the housing 3a. The guide 401 is liquid-tightly fixed to the housing 3a by swaging the open end of the recessed portion 3b.

In the guide 401, a guide hole 401a that slidably holds a shaft 402; a seat insertion hole 401b into which a seat 403 is press fit; and a communication hole 401d that causes a space 401c as part of the seat insertion hole 401b to communicate with the flow path 3c on the M/C 2 side are formed. More specifically, the space 401c is a space in the seat insertion hole 401b defined by the guide 401, shaft 402, and seat 403. The communication hole 401d is equivalent to a second flow path of the invention.

The columnar shaft 402 is formed of nonmagnetic material (for example, stainless steel). The end thereof on the seat 403 side is protruded from the guide hole 401a in the guide 401 and is extended to the space 401c and a spherical main valve body 404 is formed at the tip thereof.

A main flow path 403a that causes the space 401c in the guide 401 and the flow path 3c on the W/C 1 side to communicate with each other is formed. The main flow path 403a is located in the central part of the cylindrical seat 403 made of metal in the radial direction. A tapered main valve seat 403b with which the main valve body 404 is brought into or out of contact is formed at the end of this main flow path 403a on the space 401c side. A restriction (an orifice) 403c smaller in passage area than the main flow path 403a is formed at some midpoint in the main flow path 403a. The main valve body 404 is brought into or out of contact with the main valve seat 403b and thereby opens or closes the area between the space 401c (or the communication hole 401d in the guide 401 or the flow path 3c on the M/C 2 side) in the guide 401 and the main flow path 403a. The main flow path 403a is equivalent to a first flow path of the invention. The flow path 3c on the W/C 1 side has the discharge port of a pump 6 connected thereto between the recessed portion 3b and the W/C 1.

A sub-flow path 403d that causes the space 401c in the guide 401 and the flow path 3c on the W/C 1 side to communicate with each other is formed in a position off the radial center of the seat 403. The sub-flow path 403d is formed in parallel to the main flow path 403a. In other words, the sub-flow path 403d is connected to the flow path 3c on the W/C 1 side and the flow path 3c on the M/C 2 side with the main flow path 403a bypassed.

A tapered sub-valve seat 403e is formed at some midpoint in this sub-flow path 403d. A spherical sub-valve body 405 made of metal is movably inserted into the sub-flow path 403d between the sub-valve seat 403e and the flow path 3c on the W/C 1 side. The sub-valve body 405 is moved by a pressure difference and is brought into or out of contact with the sub-valve seat 403e and thereby opens or closes the area between the sub-flow path 403d and the flow path 3c on the W/C 1 side.

The seat portion spring receiving surface 403f that receives one end of the spring 412 described later is formed at the end of the seat 403 on the space 401c side so that it surrounds the main flow path 403a.

A foreign matter inflow prevention filter 407 is inserted on the open end side of the seat insertion hole 401b in the guide 401. The position of the sub-valve body 405 at the time of valve opening is determined by the filter 407. A foreign matter inflow prevention filter 408 is also placed on the circumference of the guide 401 so that it surrounds the communication hole 401d.

A sleeve 410 is fit onto the circumference of the other end of the guide 401. This sleeve 410 is formed of nonmagnetic metal (for example, stainless steel) in a closed-end cylindrical shape and one end thereof is open with the bottom face substantially in a spherical shape.

A substantially columnar plunger 411 made of magnetic material is placed in the space (hereafter, referred to as in-sleeve space) defined by the sleeve 410 and the guide 401. This plunger 411 can be slid in the sleeve 410. By the plunger 411 being brought into contact with the bottom face of the sleeve 410, the movement of the plunger 411 upward in the plane of the drawing is restricted.

A plunger groove 411a continuously extended from one end to the other end of the plunger 411 is formed on the outer circumferential surface of the plunger 411. The space of the in-sleeve space located on the bottom side of the sleeve 410 and the space of the in-sleeve space located between the opposite surfaces of the plunger 411 and the guide 401 communicate with each other through the plunger groove 411a.

A spool 414 on which a coil 413 that forms a magnetic field when energized is wound is placed around the sleeve 410. A yoke 415 forming a magnetic path member is placed on the circumference of the spool 414. The plunger 411 is driven by electromagnetic power generated as the result of energization of the coil 413 by ECU (Electronic Control Unit) 5. The ECU 5 controls the state of energization of the coil 413 to carry out ABS control and the like based on the driving state and the like of the vehicle.

The shaft 402 is biased toward the plunger 411 by the spring 412 clamped between the shaft 402 and the seat 403 and the shaft 402 and the plunger 411 are constantly abutted against each other and integrally operate.

The spring 412 is a compression coil spring and biases the plunger 411 and the shaft 402 in a direction in which the main valve body 404 is brought away from the main valve seat 403b, that is, in the valve opening direction. Further, the plunger 411 and the shaft 402 are biased by electromagnetic power generated by energization of the coil 413. They are biased in a direction in which the main valve body 404 is brought close to the main valve seat 403b, that is, in the valve closing direction.

The main flow path 403a communicates with the inner space of the space 401c in the guide 401 located inside the spring 412. The communication hole 401d communicates with the outside space of the space 401c in the guide 401 located outside the spring 412.

The basic structure of the electromagnetic valve in this embodiment is configured of the above structure. In the electromagnetic valve in this embodiment, the shape of the tip of the main valve body 404 is changed from those in conventional technologies. This will be described with reference to FIG. 2.

As illustrated in FIG. 2, the seat portion of the tip of the main valve body 404 brought into or out of contact with the main valve seat 403b is spherical. The main valve body 404 is provided between this seat portion and the tip with a conical portion 404a that is tapered as it goes closer to the tip. This conical portion 404a is so configured that the generatrices of the conical surface and the tangent lines to the spherical surface of the tip of the main valve body 404 agree with each other. For this reason, in a section (for example, the section in FIG. 2) in parallel to the center line of the main valve body 404, the angle $\theta 1$ formed by both the straight lines formed by the conical surface of the conical portion 404a is larger than the seat angle $\theta 2$ formed by two sides of the valve seat 403b. Further, the electromagnetic valve is so structured that at the conical portion 404a, the tip of the main valve body 404 is protruded more than in cases where the tip of the main valve body 404 is all spherical. The main valve body 404 with this structure can be formed by, for example, molding or cutting work.

Description will be given to the basic operation of the electromagnetic valve 4 having the above configuration. In normal times, the electromagnetic valve 4 is in a state in which the coil 413 is not energized by the ECU 5, that is, in a non-energized state. When the coil is not energized, the shaft 402 and the plunger 411 are biased toward the bottom side of the sleeve 410 by the spring 412 and the plunger 411 is in contact with the bottom face of the sleeve 410. Then the main valve body 404 of the shaft 402 is brought away from the main valve seat 403b of the seat 403. The flow path 3c on the W/C 1 side and the flow path 3c on the M/C 2 side communicate with each other through the main flow path 403a in the seat 403, the space 401c in the guide 401, and the communication hole 401d in the guide 401.

When the pump 6 is actuated in this state, the sub-valve body 405 is moved toward the sub-valve seat 403e of the seat 403 by a pressure difference between the W/C 1 side and the M/C 2 side. The sub-valve body 405 is abutted against the sub-valve seat 403e and the sub-flow path 403d in the seat 403 is closed. When the pump 6 is actuated, therefore, brake fluid is caused to flow from the W/C 1 side to the M/C 2 side through only the main flow path 403a among the main flow path 403a and the sub-flow path 403d in the seat 403.

When the operation of the pump 6 is stopped, the sub-valve body 405 is moved by a pressure difference between the W/C 1 side and the M/C 2 side and is brought away from the sub-valve seat 403e of the seat 403. As a result, the flow path 3c on the W/C 1 side and the flow path 3c on the M/C 2 side are caused to communicate with each other through the sub-flow path 403d in the seat 403, the space 401c in the guide 401, and the communication hole 401d in the guide 401. When the operation of the pump 6 is stopped, therefore, brake fluid can be quickly returned from the M/C 2 side to the W/C 1 side through the main flow path 403a and the sub-flow path 403d in the seat 403.

When it becomes necessary to increase the pressure in the W/C 1 by the operation of the pump 6, the ECU 5 actuates the pump 6 and energizes the coil 413 to close the main flow path 403a. This increases the W/C pressure. Then the amount of pressure differential produced between the upstream and the downstream of the electromagnetic valve 4 is linearly adjusted according to the amount of energization of the coil 413. As a result, the W/C pressure is controlled according to the amount of energization of the coil 413.

When the amount of pressure differential produced between the upstream and the downstream of the electromagnetic valve 4 is linearly adjusted according to the amount of energization of the coil 413 in this operation, a problem may arise. If the tip of the main valve body 404 is formed entirely in a spherical shape as conventional, the fluctuation in pressure differential caused by fluctuation in flow rate will be increased. More specifically, when the flowing brake fluid hits the spherical tip of the main valve body 404, the brake fluid is bounced back at substantially the same angle as that at which it hit the spherical surface. The direction of movement of the bounced brake fluid is largely inclined from the direction in which the brake fluid is to be caused to flow, that is, the direction running from the flow path 403a to the space 401c. Therefore, the flow resistance is increased and the brake fluid cannot smoothly flow and this causes the above problem.

Meanwhile, the electromagnetic valve 4 in this embodiment is provided at the tip of the main valve body 404 with the conical portion 404a. When the flowing brake fluid hits the conical portion 404a of the main valve body 404, the brake fluid is bounced back at substantially the same angle as that at which it hit the conical surface of the conical portion 404a. However, the direction of movement of the bounced brake fluid is not largely inclined from the direction in which the brake fluid is to be caused to flow. Therefore, the flow resistance is reduced as compared with cases where the tip of the main valve body 404 is spherical and the brake fluid can smoothly flow.

In addition, the conical surface of the conical portion 404a is matched with the tangent lines to the spherical surface and the boundary area between the spherical surface and the conical surface is continuous without a step. Therefore, the brake fluid is rectified by these surfaces when it flows. For this reason, it is possible to reduce the amount of fluctuation in pressure differential relative to fluctuation in the flow rate of brake fluid.

Figure 3:
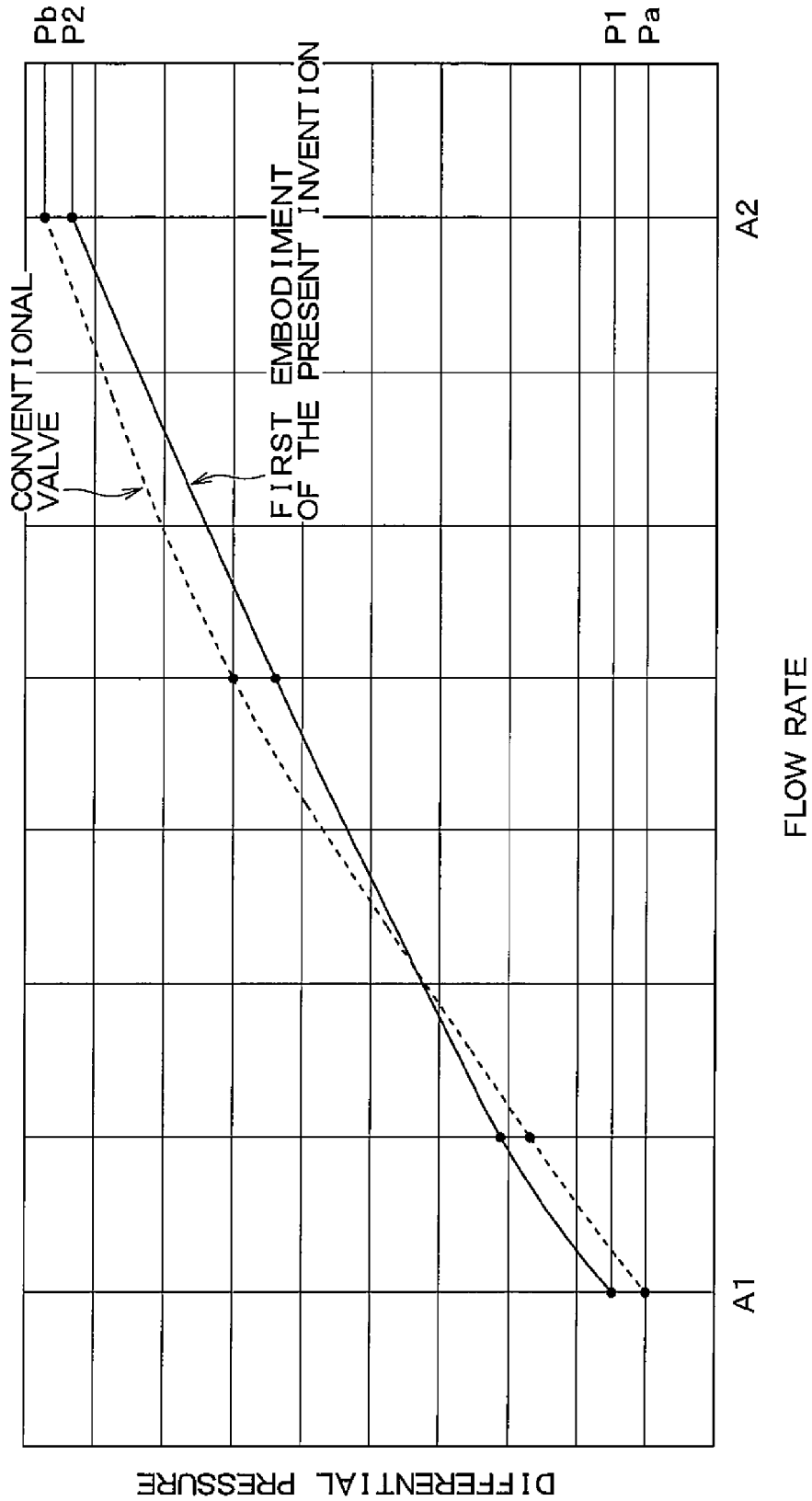
FIG. 3 is a drawing indicating the relation of a pressure differential value to the flow rate of brake fluid obtained when a main valve body 404 is provided at its tip with a conical portion 404a and when the tip of a main valve body 404 is all spherical.

FIG. 3 illustrates the result of examination on the relation of pressure differential values to the flow rate of brake fluid in a case where the conical portion 404a is provided at the tip of the main valve body 404 as in this embodiment, and a case where the tip of the main valve body 404 is all spherical as conventional.

As shown in this drawing, when the conical portion 404a is provided at the tip of the main valve body 404 as in this embodiment, the amount of fluctuation in pressure differential relative to change in the flow rate of brake fluid is reduced as compared with cases where the tip of the main valve body 404 is all spherical as conventional. A case where the flow rate of brake fluid changes from A1 to A2 will be taken as an example. In this case, the pressure differential changes from P1 to P2 with the structure in this embodiment while it changes from Pa to Pb with a conventional structure. The amount of fluctuation (P2-P1) in pressure differential with the structure in this embodiment is smaller than the amount of fluctuation (Pb-Pa) in pressure differential with the conventional structure.

When the flow rate of brake fluid changes with the amount of energization of the coil 413 identical, the produced pressure differential is changed. For the above reason, however, the deviation of this pressure differential from a desired pressure differential can be reduced.

With the amounts of energization of the coil 413 made identical, the flow rate may be varied because of variation from product to product. Also in this case, because the amount of fluctuation in pressure differential corresponding to flow rate can be reduced as in this embodiment, with the amounts of energization of the coil 413 made identical, variation in flow rate from product to product can be reduced as compared with conventional structures. Therefore, with the amount of energization of the coil 413 identical, variation in the produced pressure differential is also reduced.

With the electromagnetic valve 4 in this embodiment, as mentioned above, it is possible to reduce the amount of fluctuation in pressure differential relative to fluctuation in flow rate as compared with conventional structures. As a result, with the amount of energization of the coil 413 identical, deviation from a desired pressure differential can be reduced when the flow rate of brake fluid changes. Further, even when with the amounts of energization of the coil 413 made identical, the flow rate is varied by variation from product to product, variation in the produced pressure differential can be reduced.

(Second Embodiment)

Description will be given to a second embodiment of the invention. This embodiment is obtained by modifying the shape of the tip of the main valve body 404 in the first embodiment. The other respects are the same as those in the first embodiment and description will be given only to the difference.

Figure 4:
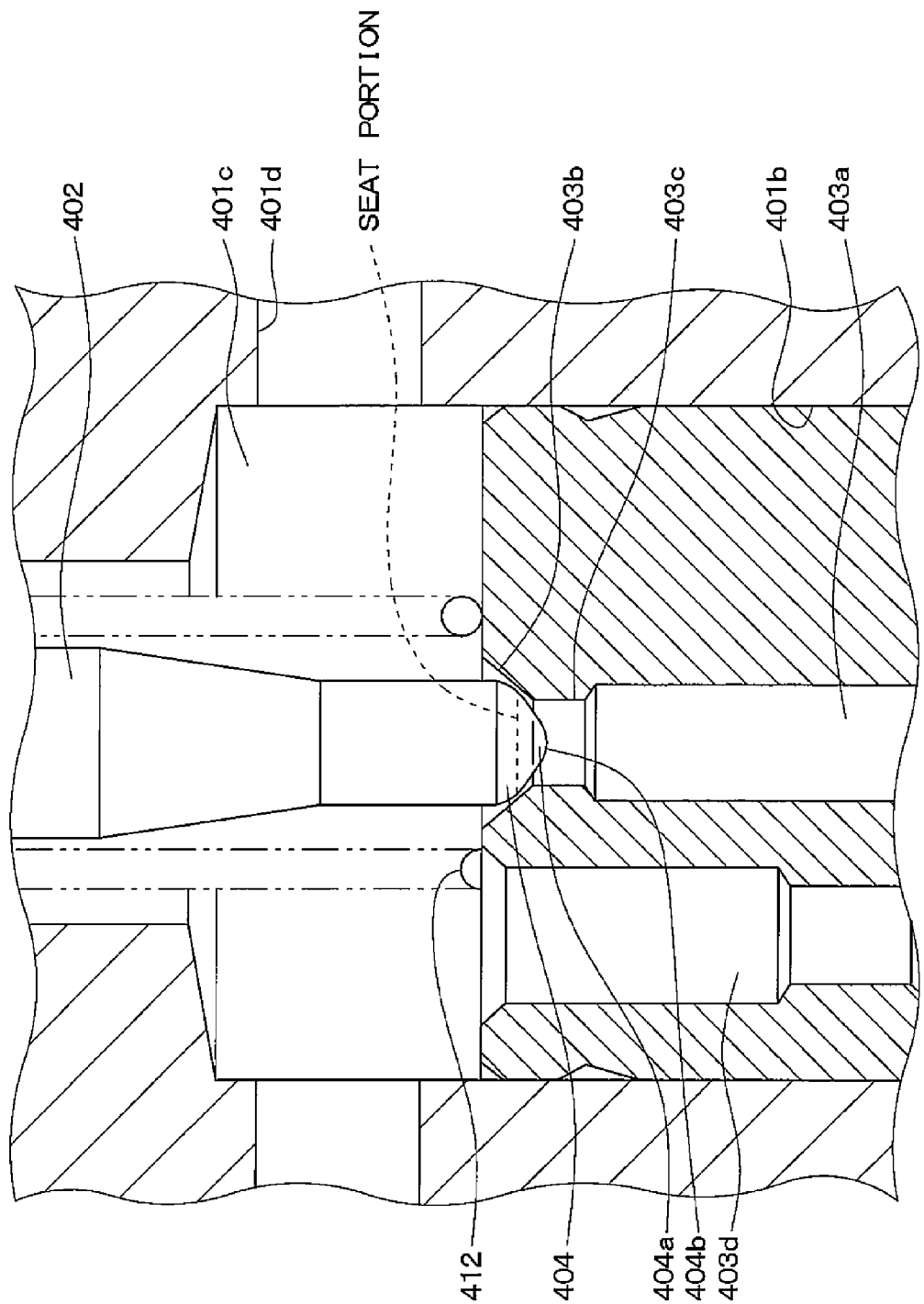
FIG. 4 is a front sectional view of a substantial part of a normally open electromagnetic valve in a second embodiment of the invention.

FIG. 4 is an enlarged sectional view of the vicinity of the main valve body 404 of the electromagnetic valve 4 in this embodiment. As illustrated in this drawing, the conical portion 404a is formed at the tip of the main valve body 404 as in the first embodiment. Further, the apex of the conical portion 404a is rounded to form a spherical surface 404b. This spherical surface 404b is smaller in radius than the spherical surface 404b of the seat portion at the tip of the main valve body 404 brought into or out of contact with the main valve seat 403b.

In the electromagnetic valve 4 with this configuration, the spherical surface 404b is formed at the tip of the conical portion 404a. Therefore, when a pressure differential is produced between the upstream and the downstream of the electromagnetic valve 4, brake fluid hits the spherical surface 404b and is bounced back. The direction of movement of the bounced brake fluid is largely inclined from the direction in which the brake fluid is to be caused to flow. For this reason, the flow resistance is increased as compared with cases where the tip of the conical portion 404a is pointed as in the first embodiment. However, since the spherical surface 404b is formed only at the tip of the conical portion 404a, the amount of increase in flow resistance is small. Therefore, also with the electromagnetic valve 4 in this embodiment, the same effect as in the first embodiment can be obtained.

As mentioned above, the main valve body 404 can be formed by molding or cutting work. When it is formed by molding, the spherical surface 404b may be formed at the tip of the conical portion 404a. Even when the spherical surface 404b is unintentionally formed in the manufacture of the main valve body 404 as mentioned above, the same effect as in the first embodiment can be obtained.

(Third Embodiment)

Description will be given to a third embodiment of the invention. This embodiment is also obtained by modifying the shape of the tip of the main valve body 404 in the first embodiment. The other respects are the same as those in the first embodiment and description will be given only to the difference.

Figure 5:
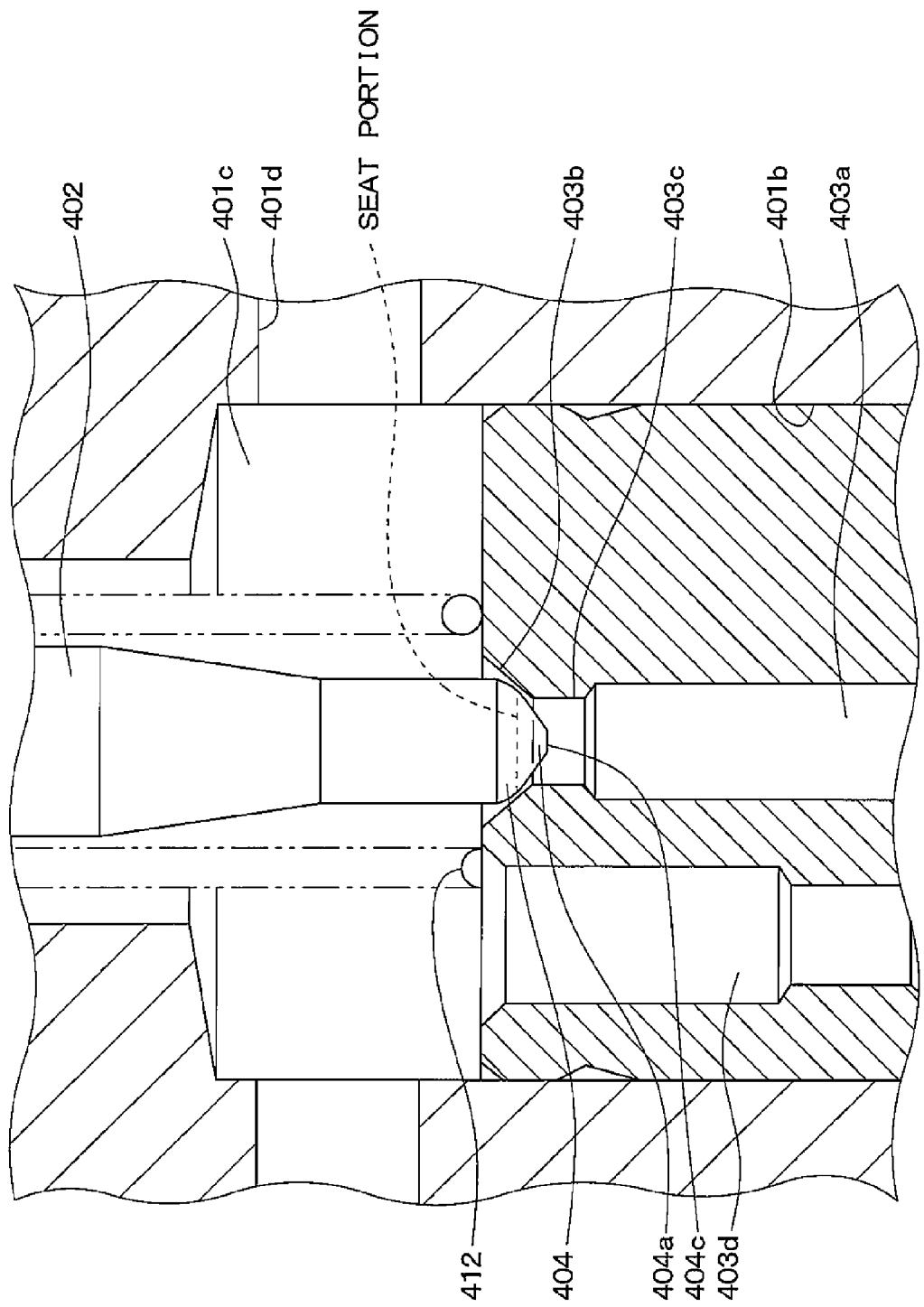
FIG. 5 is a front sectional view of a substantial part of a normally open electromagnetic valve in a third embodiment of the invention.

FIG. 5 is an enlarged sectional view of the vicinity of the main valve body 404 of the electromagnetic valve 4 in this embodiment. As illustrated in this drawing, the conical portion 404a is formed at the tip of the main valve body 404 as in the first embodiment. Further, the apex of the conical portion 404a is eliminated to form a flat surface 404c. That is, the conical portion 404a is formed in a circular truncated cone shape.

In the electromagnetic valve 4 with this configuration, the flat surface 404c is formed at the tip of the conical portion 404a. Therefore, when a pressure differential is produced between the upstream and the downstream of the electromagnetic valve 4, the flow resistance is increased as compared with cases where the spherical surface 404b is formed as in the second embodiment. However, since the flat surface 404c is formed only at the tip of the conical portion 404a also in this embodiment, the amount of increase in flow resistance is small. Also with the electromagnetic valve 4 in this embodiment, therefore, the same effect as in the first embodiment can be obtained.

As mentioned above, the main valve body 404 can be formed by molding or cutting work. When it is formed by cutting work, the flat surface 404c may be formed at the tip of the conical portion 404a. Even when the flat surface 404c is unintentionally formed in the manufacture of the main valve body 404 as mentioned above, the same effect as in the first embodiment can be obtained.

(Other Embodiments)

In the above description of each embodiment, cases where the conical portion 404a is provided at the tip of the main valve body 404 of a normally open electromagnetic valve 4 have been taken as examples. However, the same structure can also be adopted for normally closed electromagnetic valves. That is, even in a normally closed electromagnetic valve, it is possible to linearly adjust the amount of pressure differential produced between the upstream and the downstream of the electromagnetic valve according to the amount of energization of a coil. The same effect as in each of the above embodiments can be obtained by providing a conical portion at the tip of a main valve body in those in which the amount of pressure differential is linearly adjusted as mentioned above.

In the above description of each embodiment, cases where the electromagnetic valve 4 is applied to a system in which a pressure differential is produced in brake fluid as one of fluids between the W/C 1 and the M/C 2 have been taken as examples. However, the invention may be applied to any other system.

What is claimed is:

1. An electromagnetic valve comprising:
   a seat including a valve seat and a first flow path formed on the upstream side of the valve seat in terms of fluid flow;
   a valve body opening or closing the area between the first flow path on the upstream side of the valve seat in terms of fluid flow and a second flow path on the downstream side of the valve seat in terms of fluid flow;

a coil forming a magnetic field when energized;

a plunger moved in a direction in which the valve body is brought into contact with the valve seat or in a direction in which the valve body is brought away from the valve seat by energization of the coil; and a shaft including the valve body and moved in conjunction with the movement of the plunger, the distance between the valve body and the valve seat being controlled by adjustment of the amount of energization of the coil and a pressure differential between the fluid pressure in the first flow path and the fluid pressure in the second flow path being controlled, wherein the valve body has a seat portion thereof brought into contact with the valve seat configured as a spherical surface and includes a conical portion between the seat portion and the tip thereof, the conical portion being disposed on the upstream side of the seat portion in terms of fluid flow, and wherein the generatrices of the conical portion and the tangent lines to the spherical surface are matched with each other.

2. The electromagnetic valve according to claim 1, wherein the tip of the conical portion is configured as a spherical surface.

3. The electromagnetic valve according to claim 1, wherein the tip of the conical portion is configured as a flat surface.

4. The electromagnetic valve according to claim 1, further comprising a wheel-cylinder flow path in fluid communication with the first flow path, wherein the seat further comprises a sub-flow path in fluid communication with the second flow path, and a sub-valve body is brought into and out of contact with a sub-valve seat of the seat to thereby open or close an area between the sub-flow path and the wheel-cylinder flow bath based on the pressure differential.

* * * * *